(12) United States Patent
Park et al.

(10) Patent No.: US 11,393,214 B2
(45) Date of Patent: Jul. 19, 2022

(54) APPARATUS AND METHOD FOR CONGESTION VISUALIZATION

(71) Applicant: SAMSUNG SDS CO., LTD., Seoul (KR)

(72) Inventors: Yong-Guk Park, Seoul (KR); Min-Soon Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/652,814

(22) PCT Filed: Apr. 30, 2019

(86) PCT No.: PCT/KR2019/005219
§ 371 (c)(1),
(2) Date: Apr. 1, 2020

(87) PCT Pub. No.: WO2019/231119
PCT Pub. Date: Dec. 5, 2019

(65) Prior Publication Data
US 2020/0234059 A1    Jul. 23, 2020

(30) Foreign Application Priority Data
May 31, 2018   (KR) .................. 10-2018-0062345

(51) Int. Cl.
*G09G 5/00*    (2006.01)
*G06V 20/52*   (2022.01)
(Continued)

(52) U.S. Cl.
CPC ............. *G06V 20/53* (2022.01); *G06T 5/006* (2013.01); *G06T 11/60* (2013.01); *H04N 7/181* (2013.01); *G06T 2207/30196* (2013.01)

(58) Field of Classification Search
CPC .............. G09G 5/14; G09G 2340/10; G09G 2340/125; G06T 11/60; G06T 15/503
(Continued)

(56) References Cited

U.S. PATENT DOCUMENTS

2002/0041328 A1* 4/2002 LeCompte .......... G01C 11/025
348/144
2016/0163075 A1 6/2016 Bae et al.
(Continued)

FOREIGN PATENT DOCUMENTS

| JP | 2004-272756 A | 9/2004 |
| KR | 10-2016-0068461 A | 6/2016 |
| KR | 10-2017-0100204 A | 9/2017 |
| WO | WO 2017/043002 A1 | 3/2017 |
| WO | WO 2017/122258 A1 | 7/2017 |

OTHER PUBLICATIONS

International Search Report for PCT/KR2019/005219 dated Aug. 14, 2019.
(Continued)

*Primary Examiner* — Gordon G Liu
(74) *Attorney, Agent, or Firm* — The PL Law Group, PLLC

(57) ABSTRACT

An apparatus for congestion visualization according to an embodiment of the present invention includes an area-specific image storage configured to store area-specific images captured by a plurality of cameras which capture different regions in a specific space, respectively, a two-dimensional map storage configured to store a two-dimensional map for the specific space, an area-specific congestion calculator configured to calculate, based on the area-specific images, an area-specific congestion for each of capturing areas captured by the plurality of cameras in the specific space, a mapping area identifier configured to identify a mapping area corresponding to each of the capturing areas on the two-dimensional map, based on a mapping point set
(Continued)

in each of the two-dimensional map and the area-specific images, and an area-specific congestion visualizer configured to visually displaying, on the two-dimensional map, the area-specific congestion for each of the capturing areas, based on the mapping area.

18 Claims, 6 Drawing Sheets

(51) Int. Cl.
  *G06T 5/00* (2006.01)
  *G06T 11/60* (2006.01)
  *H04N 7/18* (2006.01)
(58) Field of Classification Search
  USPC .......................................................... 345/629
  See application file for complete search history.

(56) References Cited

U.S. PATENT DOCUMENTS

| 2017/0301220 | A1* | 10/2017 | Jarrell | H04W 4/38 |
| 2018/0089533 | A1* | 3/2018 | Zagaynov | G06K 9/00483 |
| 2018/0239948 | A1* | 8/2018 | Rutschman | G06T 7/20 |
| 2018/0247135 | A1* | 8/2018 | Oami | G06T 11/60 |

OTHER PUBLICATIONS

European Search Report for EP19810277.4 dated Feb. 12, 2021 from European patent office in a counterpart European patent application.

Ruz, C et al. "Visual Recognition to Access and Analyze People Density and Flow Patterns in Indoor Environments" 2015 IEEE Winter Conference on Applications of Computer Vision, IEEE, Jan. 2015, pp. 1-8, XP032738261.

* cited by examiner

APPARATUS AND METHOD FOR CONGESTION VISUALIZATION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/005219 filed on Apr. 30, 2019, which claims priority to the benefit of Korean Patent Application No. 10-2018-0062345 filed in the Korean Intellectual Property Office on May 31, 2018, the entire contents of which are incorporated herein by reference.

TECHNICAL FIELD

The present invention relates to a technology for congestion visualization.

BACKGROUND ART

It is necessary to know a frequency of movement of people for each area in a specific space, such as a store. This is because, by changing locations of products within the store with reference to the area-specific frequency of movement of people, it is possible to maximize the business profit through the sales of products. Besides, by changing the placement of a display screen installed for advertising the products, it is possible to maximize the business profit through advertisement.

Therefore, it may be considered to identify a frequency of movement of people for each area where a camera is installed by using the cameras installed in a specific space, such as a store. However, in a case where areas captured by the respective cameras installed in the specific space overlap each other, a problem arises in that it is difficult to accurately identify the frequency of movement of people in the overlapping area. Also, in this case, when the frequency of movement of people is identified for each area in which the cameras are installed, there is a problem in that it is difficult to identify to which region of an image captured by the camera the frequency of movement of people in the space where the camera is installed is related.

In view of these problems, an invention is required to accurately identify a degree of congestion for each area in a specific space.

SUMMARY

Disclosed embodiments are intended to provide an apparatus and method for congestion visualization.

According to disclosed embodiments, there is provided an apparatus for congestion visualization including: an area-specific image storage configured to store area-specific images captured by a plurality of cameras that respectively capture different areas in a specific space; a two-dimensional map storage configured to store a two-dimensional map for the specific space; an area-specific congestion calculator configured to calculate, based on the area-specific images, an area-specific congestion for each of areas captured by the plurality of cameras in the specific space; a mapping area identifier configured to identify a mapping area corresponding to each of the captured areas on the two-dimensional map, based on a mapping point set in each of the two-dimensional map and the area-specific images; and an area-specific congestion visualizer configured to visually display, on the two-dimensional map, the area-specific congestion for each of the captured areas, based on the mapping area.

The area-specific congestion calculator may be further configured to calculate the area-specific congestion for each of the areas captured by the plurality of cameras by using frames of the area-specific image captured by each of the plurality of cameras.

The mapping point may be set by a user.

Each of the area-specific images and the two-dimensional map may have the same number of mapping points set therein and each of the mapping points set in the area-specific images corresponds to each of the mapping points set in the two-dimensional map.

The mapping area identifier may be further configured to identify, in the two-dimensional map, the mapping area that corresponds to each of the captured areas by using one or more transformation matrices for matching a coordinate value of each of the mapping points set in the area-specific image and a coordinate value of each of the mapping points set in the two-dimensional map.

The transformation matrices may include a transformation matrix for performing at least one of parallel translation, size transformation, and rotation with respect to a coordinate value of each of the mapping points set in the area-specific image.

The mapping area identifier may be further configured to identify, in the two-dimensional map, the mapping area that corresponds to each of the captured areas by multiplying a coordinate value of each pixel included in the area-specific image by the transformation matrix.

When an overlapping area that overlaps between the mapping areas corresponding to the respective captured areas exists in the two-dimensional map, the area-specific congestion visualizer may be further configured to correct a congestion of the overlapping area and visually display the corrected congestion on the two-dimensional map.

The area-specific congestion visualizer may be further configured to correct the congestion of the overlapping area on the basis of a mean value or a median value for the congestions of areas that corresponds to the overlapping area among the captured areas.

The area-specific congestion visualizer may be further configured to display a heat map on the two-dimensional map according to the area-specific congestion for each of the captured areas.

According to other disclosed embodiments, there is provided a method for congestion visualization which is performed by an apparatus for congestion visualization, the method including: storing area-specific images captured by a plurality of cameras that respectively capture different areas in a specific space; storing a two-dimensional map for the specific space; calculating, based on the area-specific images, an area-specific congestion for each of areas captured by the plurality of cameras in the specific space; identifying a mapping area corresponding to each of the captured areas on the two-dimensional map, based on a mapping point set in each of the two-dimensional map and the area-specific images; and visually displaying, on the two-dimensional map, the area-specific congestion for each of the captured areas, based on the mapping area.

The calculating of the area-specific congestion calculation may include calculating the area-specific congestion for each of the areas captured by the plurality of cameras by using frames of the area-specific image captured by each of the plurality of cameras.

The mapping point may be set by a user.

Each of the area-specific images and the two-dimensional map may have the same number of mapping points set therein and each of the mapping points set in the area-specific images corresponds to each of the mapping points set in the two-dimensional map.

The identifying of the mapping area may include identifying, in the two-dimensional map, the mapping area that corresponds to each of the captured areas by using one or more transformation matrices for matching a coordinate value of each of the mapping points set in the area-specific image and a coordinate value of each of the mapping points set in the two-dimensional map.

The transformation matrices may include a transformation matrix for performing at least one of parallel translation, size transformation, and rotation with respect to a coordinate value of each of the mapping points set in the area-specific image.

The identifying of the mapping area may include identifying, in the two-dimensional map, the mapping area that corresponds to each of the captured areas by multiplying a coordinate value of each pixel included in the area-specific image by the transformation matrix.

When an overlapping area that overlaps between the mapping areas corresponding to the respective captured areas exists in the two-dimensional map, the visually displaying of the area-specific congestion may include correcting a congestion of the overlapping area and visually displaying the corrected congestion on the two-dimensional map.

The correcting of the area-specific congestion may include correcting the congestion of the overlapping area on the basis of a mean value or a median value for the congestions of areas that corresponds to the overlapping area among the captured areas.

The visually displaying of the area-specific congestion may include displaying a heat map on the two-dimensional map according to the area-specific congestion for each of the captured areas.

According to disclosed embodiments, it is possible to accurately identify a degree of congestion for each area in a specific space.

According to disclosed embodiments, a frequency of movement of people for each area in a specific space may be identified at a glance, so that it is possible to maximize the business profit through the sales and advertisement of products.

DETAILED DESCRIPTION

Figure 1:
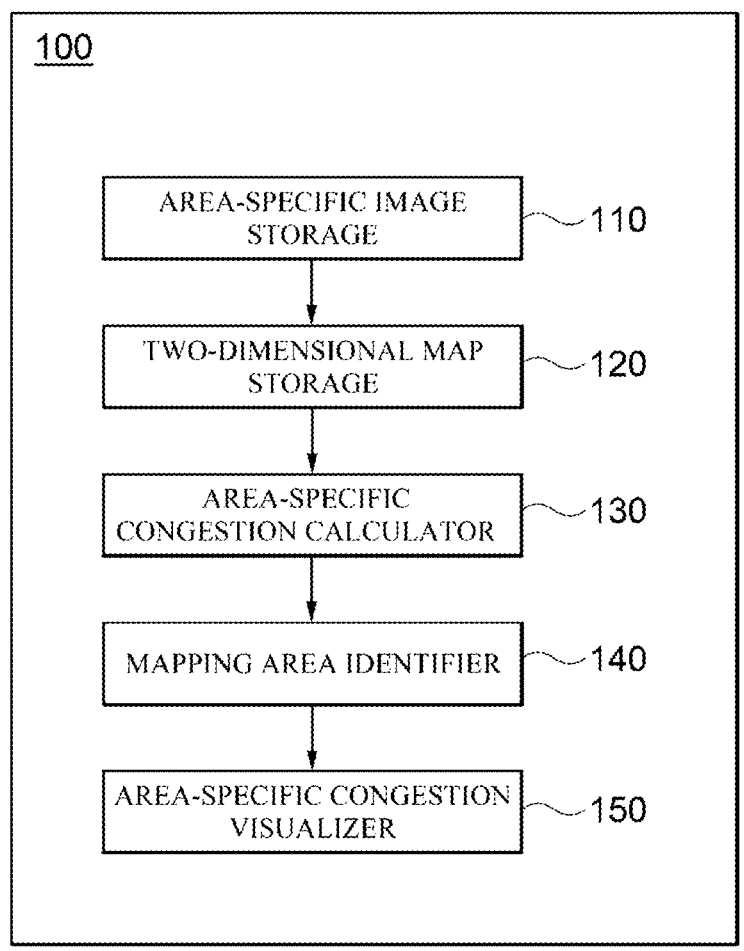
FIG. 1 is a block diagram illustrating an apparatus for congestion visualization according to one embodiment.

Hereinafter, the embodiments disclosed herein will be described in detail with reference to the accompanying drawings, and the same or similar elements are designated with the same numeral references regardless of the numerals in the drawings and their redundant description will be omitted. In the following description, the suffixes "module" and "unit" of elements herein are used for convenience of description and thus can be used interchangeably and do not have any distinguishable meanings or functions. In describing the present invention, moreover, a detailed description of known functions and configurations incorporated herein will be omitted when it may obscure the subject matter with unnecessary detail. It should be understood that the accompanying drawings are merely illustrated to easily explain example embodiments, and therefore, they should not be construed to limit the inventive concepts disclosed herein, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another.

It will be understood that when an element is referred to as being "connected to," "coupled to," or "access" another element, it may be directly connected to or directly access the other element or intervening elements may be present. In contrast, when an element is referred to as being "directly connected to," "directly coupled to," or "directly accessing" another element, there are no intervening elements present.

As used herein, the singular forms "a," "an" and "the" are intended to include the plural forms as well, unless the context clearly indicates otherwise.

It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

The present invention will now be described more fully with reference to the accompanying drawings, in which exemplary embodiments of the invention are shown. It will be apparent to those skilled in the art that the present invention may be embodied in other specific ways than those herein set forth without departing from the spirit and essential characteristics of the invention.

FIG. 1 is a block diagram illustrating an apparatus for congestion visualization according to one embodiment.

Referring to FIG. 1, the apparatus 100 for congestion visualization according to one embodiment includes an area-specific image storage 110, a two-dimensional map storage 120, an area-specific congestion calculator 130, a mapping area identifier 140, and an area-specific congestion visualizer 150.

The area-specific image storage 110 stores area-specific images captured by a plurality of cameras which respectively capture different areas in a specific space. Here, the specific space may be a store or a showroom.

The two-dimensional map storage 120 stores a two-dimensional map for the specific space captured by the plurality of cameras. The two-dimensional map for the specific space may be a floor map viewed from above the specific space.

The area-specific congestion calculator 130 calculates, on the basis of the area-specific images captured by the plurality of cameras, an area-specific congestion for each of the areas captured by the plurality of cameras in the specific space. Here, the captured area refers to an area captured by a specific camera in the specific space. In addition, the area-specific congestion may refer to a degree of congestion of each area included in the area captured by a specific camera, and a degree of congestion may refer to data that quantifies the movements of objects (e.g., persons) existing in each of the area-specific images.

According to one embodiment, the area-specific congestion calculator 130 may use a frame-specific image change amount for each of the area-specific images to calculate the area-specific congestion for each of the areas captured by the plurality of cameras. Specifically, the area-specific congestion calculator 130 may calculate the area-specific congestion from the amount of change in brightness or color difference of each frame for each of the area-specific images. However, the method of calculating the area-specific congestion is not necessarily limited to a specific method.

The mapping area identifier 140 identifies, in the two-dimensional map, a mapping area that corresponds to each of the areas captured by the plurality of cameras on the basis of a mapping point set in each of the two-dimensional map and the area-specific images captured by the plurality of cameras. In this case, the mapping point refers to a reference point used to map the area-specific image and the two-dimensional map.

According to one embodiment, the mapping point may be set by a user. The same number of mapping points may be set in each of the area-specific image and the two-dimensional map, and each of the mapping points set in the area-specific image may correspond to each of the mapping points set in the two-dimensional map. Three or more mapping points may be set in each of the area-specific image and the two-dimensional map.

According to one embodiment, the mapping area identifier 140 may identify, in the two-dimensional map, a mapping area corresponding to each of the captured areas by using one or more transformation matrices for matching a coordinate value of each of the mapping points set in the area-specific image and a coordinate value of each of the mapping points set in the two-dimensional map.

According to one embodiment, the transformation matrices may include a transformation matrix for performing at least one of parallel translation, size transformation, and rotation with respect to the coordinate value of each of the mapping points set in the area-specific image. In a case where the transformation matrix is generated, the mapping area identifier 140 may identify, in the two-dimensional map, the mapping area corresponding to each of the captured areas by multiplying a coordinate value of each pixel included in the area-specific image by the transformation matrix.

A detailed method of setting the mapping point and identifying the mapping area will be described below with reference to FIGS. 2 to 5.

The area-specific congestion visualizer 150 visually displays, on the two-dimensional map, the area-specific congestion of each of the captured areas on the basis of the mapping area. For example, the area-specific congestion visualizer 150 may display a heat map on the two-dimensional map according to the area-specific congestion for each of the captured areas. Specifically, the area-specific congestion visualizer 150 may visually display the area-specific congestion on the two-dimensional map by varying the color or shade according to the degree of congestion.

Meanwhile, according to one embodiment of the present invention, when an overlapping area that overlaps between the mapping areas corresponding to the respective captured areas exists in the two-dimensional map, the area-specific congestion visualizer 150 may correct the congestion of the overlapping area and visually display the corrected congestion on the two-dimensional map. For example, the area-specific congestion visualizer 150 may correct the congestion of the overlapping area on the basis of a mean value or a median value for the congestions of the areas that correspond to the overlapping area among the captured areas.

Figure 2:
FIG. 2 is a picture showing an example of an image captured by a camera that captures a specific space according to one embodiment.
Figure 3:
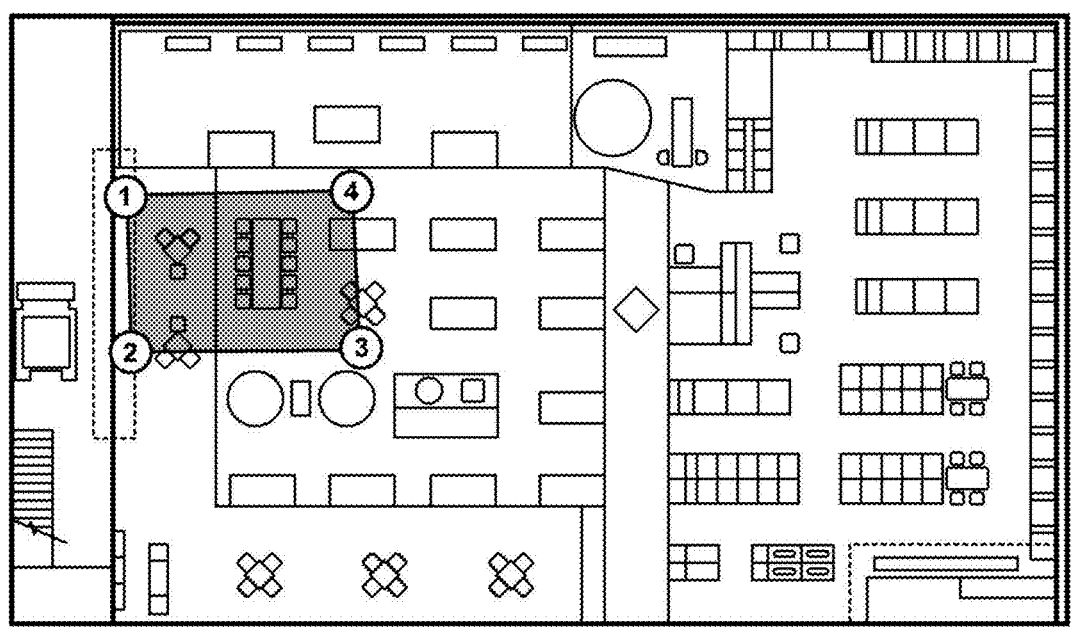
FIG. 3 is a diagram illustrating a two-dimensional map for a specific space according to one embodiment.

FIG. 2 is a picture showing an example of an image captured by a camera that captures a specific space according to one embodiment and FIG. 3 is a diagram illustrating a two-dimensional map for a specific space according to one embodiment.

An image of an area may be different from a two-dimensional map since it is an image captured by a camera installed at a specific point. Therefore, it is necessary to map the image of the area and the two-dimensional map in order to identify, in the two-dimensional map, a mapping area corresponding to each of the captured areas included in an area-specific image.

Specifically, in the examples shown in FIGS. 2 and 3, points 1, 2, 3, and 4 corresponding to corners of a rectangle are mapping points set by a user.

The specific numbers 1, 2, 3, and 4 shown in FIGS. 2 and 3 indicate the order in which the corresponding mapping point is set by the user. The mapping points 1, 2, 3, and 4 shown in FIG. 2 correspond to the mapping points 1, 2, 3, and 4 shown in FIG. 3, respectively.

Figure 4:
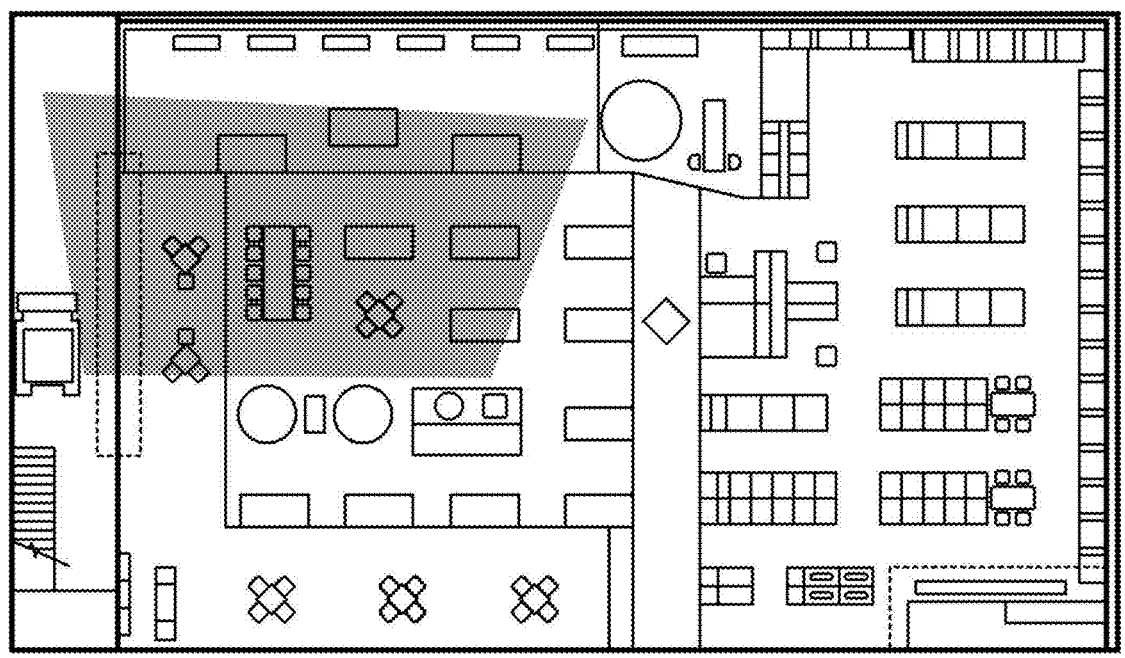
FIG. 4 is a diagram illustrating an example of a mapping area corresponding to a captured area on a two-dimensional map for a specific space according to one embodiment.

FIG. 4 is a diagram illustrating an example of a mapping area corresponding to a captured area on a two-dimensional map for a specific space according to one embodiment.

Specifically, FIG. 4 illustrates an example in which a mapping area that corresponds to a captured area in the captured image shown in FIG. 2 is identified in the two-dimensional map illustrated in FIG. 3.

The mapping area identifier 140 may generate one or more transformation matrices for matching a coordinate value of each of the mapping points 1, 2, 3, and 4 shown in FIG. 2 and a coordinate value of each of the mapping points 1, 2, 3, and 4 shown in FIG. 3. Thereafter, the mapping area identifier 140 may identify the mapping area corresponding to the captured area in the two-dimensional map shown in FIG. 3 by multiplying a coordinate value of each pixel included in the captured area in the captured image shown in FIG. 2 by the transformation matrix.

Figure 5:
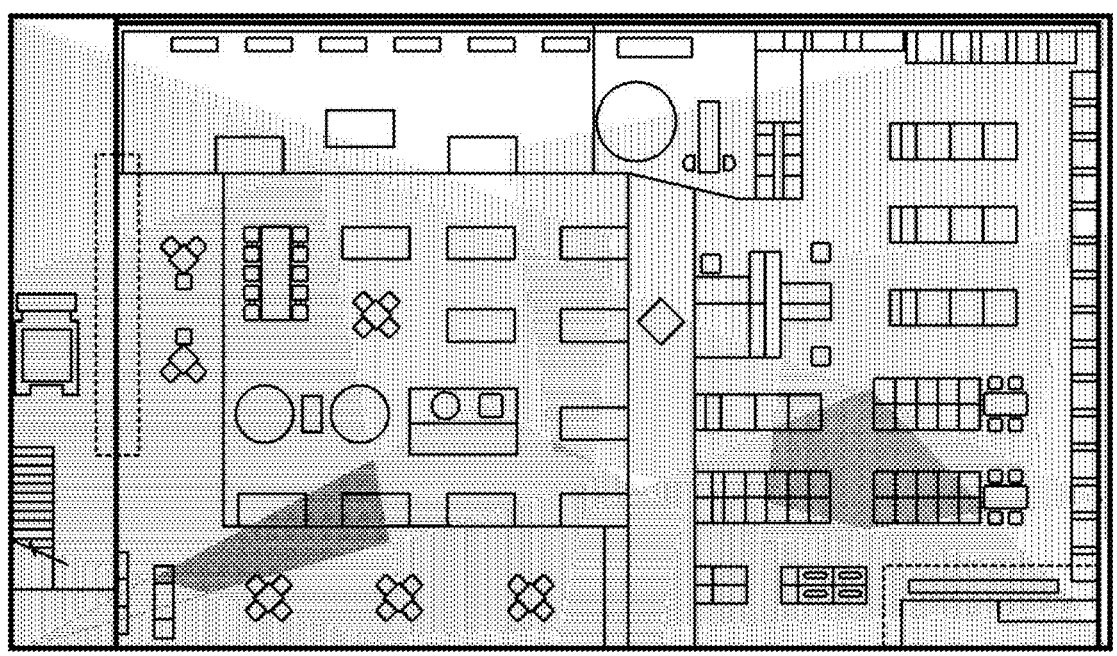
FIG. 5 is a diagram illustrating an example of a mapping area corresponding to a captured area on a two-dimensional map for a specific space according to another embodiment.

FIG. 5 is a diagram illustrating an example of a mapping area corresponding to a captured area on a two-dimensional map for a specific space according to another embodiment.

Specifically, FIG. 5 illustrates mapping areas corresponding to the respective captured areas on a two-dimensional map for a specific space. Among the mapping areas shown in FIG. 5, an area with a high shade density indicates an overlapping area that overlaps between the mapping areas.

In this case, when the area-specific congestion visualizer 150 visually displays the area-specific congestion for each of the captured areas on the two-dimensional map in an overlapping manner, a problem arises in that it is difficult to accurately identify a degree of congestion in the overlapping area. Therefore, the area-specific congestion visualizer 150 needs to correct the degree of congestion of the overlapping area and visually display the corrected degree of congestion on the two-dimensional map.

Figure 6:
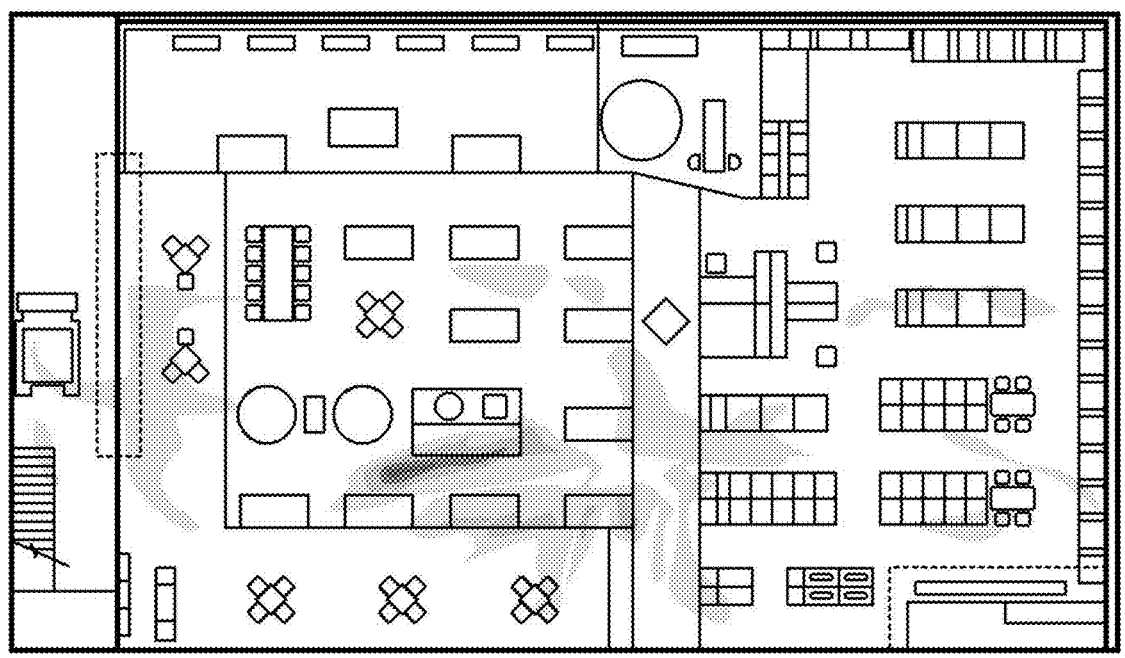
FIG. 6 is a diagram illustrating an example in which area-specific congestions are visually displayed on a two-dimensional map for a specific space according to one embodiment.

FIG. 6 is a diagram illustrating an example in which area-specific congestions are visually displayed on a two-dimensional map for a specific space according to one embodiment.

Specifically, FIG. 6 is a diagram illustrating an example in which a heat map is displayed on a two-dimensional map according to an area-specific congestion of each captured area by correcting a degree of congestion of an overlapping area.

With such a heat map, it is possible to accurately identify the area-specific congestion in the specific space.

Figure 7:
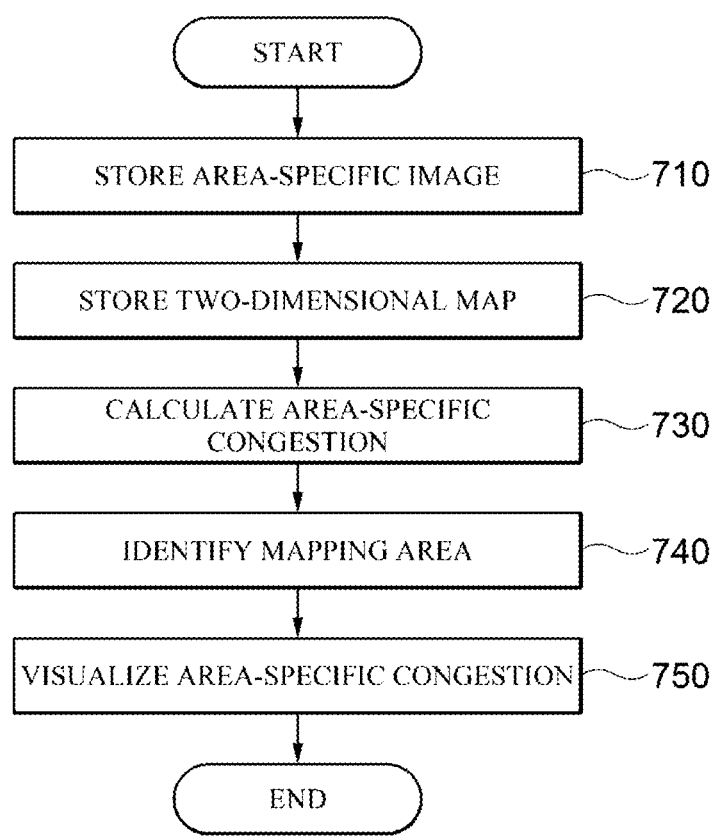
FIG. 7 is a flowchart illustrating a method of congestion visualization according to one embodiment.

FIG. 7 is a flowchart illustrating a method of congestion visualization according to one embodiment. In the illustrated flowchart, the method is described as being divided into a plurality of operations. However, it should be noted that at least some of the operations may be performed in a different order or may be combined into fewer operations or further divided into more operations. In addition, some of the operations may be omitted, or one or more extra operations, which are not illustrated, may be added to the flowchart and be performed.

First, an area-specific image storage 110 stores area-specific images captured by a plurality of cameras that respectively capture different areas in a specific space (710).

Then, a two-dimensional map storage 120 stores a two-dimensional map for the specific space (720).

Subsequently, an area-specific congestion calculator 130 calculates, on the basis of the area-specific images captured by the plurality of cameras, an area-specific congestion for each of the areas captured by the plurality of cameras in the specific space (730).

According to one embodiment, the area-specific congestion calculator 130 may use a frame-specific image change amount for each of the area-specific images to calculate the area-specific congestion for each of the areas captured by the plurality of cameras.

Then, the mapping area identifier 140 identifies, in the two-dimensional map, a mapping area that corresponds to each of the areas captured by the plurality of cameras on the basis of a mapping point set in each of the two-dimensional map and the area-specific images captured by the plurality of cameras (740).

According to one embodiment, the mapping point may be set by a user. The same number of mapping points may be set in each of the area-specific image and the two-dimensional map, and each of the mapping points set in the area-specific image may match each of the mapping points set in the two-dimensional map.

According to one embodiment, the mapping area identifier 140 may identify, in the two-dimensional map, a mapping area corresponding to each of the captured areas by using a transformation matrix for matching a coordinate value of each of the mapping points set in the area-specific image and a coordinate value of each of the mapping points set in the two-dimensional map.

According to one embodiment, the transformation matrix may include a transformation matrix for performing at least one of parallel translation, size transformation, and rotation with respect to the coordinate value of each of the mapping points set in the area-specific image. In a case where the transformation matrix is generated, the mapping area identifier 140 may identify, in the two-dimensional map, the mapping area corresponding to each of the captured areas by multiplying a coordinate value of each pixel included in the area-specific image by the transformation matrix.

Subsequently, the area-specific congestion visualizer 150 visually displays the area-specific congestion of each of the captured areas on the two-dimensional map on the basis of the mapping area (750). For example, the congestion visualizer 150 may display a heat map on the two-dimensional map according to the area-specific congestion for each of the captured areas. Specifically, the area-specific congestion visualizer 150 may visually display the area-specific congestion on the two-dimensional map by varying the color or shade according to the degree of congestion.

Meanwhile, according to one embodiment of the present invention, when an overlapping area that overlaps between the mapping areas corresponding to the respective captured areas exists in the two-dimensional map, the area-specific congestion visualizer 150 may correct the congestion of the overlapping area and visually display the corrected congestion on the two-dimensional map. For example, the area-specific congestion visualizer 150 may correct the congestion of the overlapping area on the basis of a mean value or a median value of the congestions of the areas that correspond to the overlapping area among the captured areas.

Figure 8:
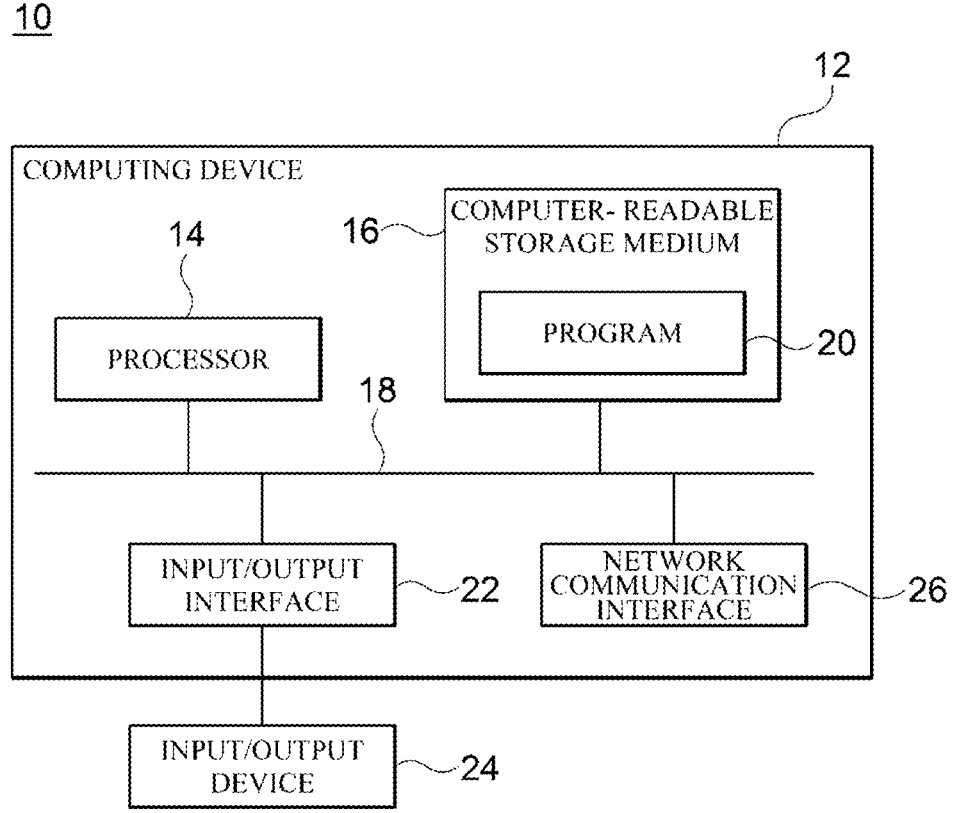
FIG. 8 is a block diagram for describing a computing environment including a computing device suitable to be used in exemplary embodiments.

FIG. 8 is a block diagram for describing a computing environment including a computing device suitable to be used in exemplary embodiments.

In the illustrated embodiments, each of the components may have functions and capabilities different from those described hereinafter and additional components may be included in addition to the components described herein.

The illustrated computing environment 10 includes a computing device 12. In one embodiment, the computing device 12 may be an apparatus for congestion visualization. The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a capturing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

The invention claimed is:

1. An apparatus for visualizing congestion of people, comprising:
an area-specific image storage configured to store area-specific images captured by a plurality of cameras that respectively capture different areas in a specific space;
a two-dimensional map storage configured to store a two-dimensional map for the specific space;
an area-specific congestion calculator configured to calculate, based on the area-specific images, an area-specific congestion for each of areas captured by the plurality of cameras in the specific space, wherein the area-specific congestion is a degree of congestion of the each of areas, and the degree of congestion is related to data that quantifies the movements of the people existing in each of the area-specific images;
a mapping area identifier configured to identify a mapping area corresponding to each of the captured areas on the two-dimensional map, based on a mapping point set in each of the two-dimensional map and the area-specific images; and
an area-specific congestion visualizer configured to visually display, on the two-dimensional map, the area-specific congestion for each of the captured areas, based on the mapping area,
wherein, when an overlapping area that overlaps between the mapping areas corresponding to the respective captured areas exists in the two-dimensional map, the area-specific congestion visualizer is further configured to correct a congestion of the overlapping area based on calculation of congestions of areas that corresponds to the overlapping area among the captured areas and visually display the corrected congestion on the two-dimensional map.

2. The apparatus of claim 1, wherein the area-specific congestion calculator is further configured to calculate the area-specific congestion for each of areas captured by the plurality of cameras by using frames of the area-specific image captured by each of the plurality of cameras.

3. The apparatus of claim 1, wherein the mapping point is set by a user.

4. The apparatus of claim 1, wherein each of the area-specific images and the two-dimensional map has the same number of mapping points set therein and each of the mapping points set in the area-specific images corresponds to each of the mapping points set in the two-dimensional map.

5. The apparatus of claim 4, wherein the mapping area identifier is further configured to identify, in the two-dimensional map, the mapping area that corresponds to each of the captured areas by using one or more transformation matrices for matching a coordinate value of each of the mapping points set in the area-specific image and a coordinate value of each of the mapping points set in the two-dimensional map.

6. The apparatus of claim 5, wherein the transformation matrices include a transformation matrix for performing at least one of parallel translation, size transformation, and rotation with respect to a coordinate value of each of the mapping points set in the area-specific image.

7. The apparatus of claim 6, wherein the mapping area identifier is further configured to identify, in the two-dimensional map, the mapping area that corresponds to each of the captured areas by multiplying a coordinate value of each pixel included in the area-specific image by the transformation matrix.

8. The apparatus of claim 1, wherein the area-specific congestion visualizer is further configured to correct the congestion of the overlapping area based on a mean value or a median value for the congestions of areas that corresponds to the overlapping area among the captured areas.

9. The apparatus of claim 1, wherein the area-specific congestion visualizer is further configured to display a heat map on the two-dimensional map according to the area-specific congestion for each of the captured areas.

10. A method for visualizing congestion of people which is performed by an apparatus for congestion visualization, the method comprising:
storing area-specific images captured by a plurality of cameras that respectively capture different areas in a specific space;
storing a two-dimensional map for the specific space;
calculating, based on the area-specific images, an area-specific congestion for each of areas captured by the plurality of cameras in the specific space, wherein the area-specific congestion is a degree of congestion of the each of areas, and the degree of congestion is related to data that quantifies the movements of the people existing in each of the area-specific images;
identifying a mapping area corresponding to each of the captured areas on the two-dimensional map, based on a mapping point set in each of the two-dimensional map and the area-specific images; and
visually displaying, on the two-dimensional map, the area-specific congestion for each of the captured areas, based on the mapping area,
wherein, when an overlapping area that overlaps between the mapping areas corresponding to the respective captured areas exists in the two-dimensional map, the visually displaying of the area-specific congestion comprises correcting a congestion of the overlapping area based on calculation of congestions of areas that corresponds to the overlapping area among the captured areas and visually displaying the corrected congestion on the two-dimensional map.

11. The method of claim 10, wherein the calculating of the area-specific congestion calculation comprises calculating the area-specific congestion for each of the areas captured by the plurality of cameras by using frames of the area-specific image captured by each of the plurality of cameras.

12. The method of claim 10, wherein the mapping point is set by a user.

13. The method of claim 10, wherein each of the area-specific images and the two-dimensional map has the same number of mapping points set therein and each of the mapping points set in the area-specific images corresponds to each of the mapping points set in the two-dimensional map.

14. The method of claim 13, wherein the identifying of the mapping area comprises identifying, in the two-dimensional map, the mapping area that corresponds to each of the captured areas by using one or more transformation matrices for matching a coordinate value of each of the mapping points set in the area-specific image and a coordinate value of each of the mapping points set in the two-dimensional map.

15. The method of claim 14, wherein the transformation matrices include a transformation matrix for performing at least one of parallel translation, size transformation, and rotation with respect to a coordinate value of each of the mapping points set in the area-specific image.

16. The method of claim 15, wherein the identifying of the mapping area comprises identifying, in the two-dimensional map, the mapping area that corresponds to each of the captured areas by multiplying a coordinate value of each pixel included in the area-specific image by the transformation matrix.

17. The method of claim 10, wherein the correcting of the area-specific congestion comprises correcting the congestion of the overlapping area on the basis of a mean value or a median value for the congestions of areas that corresponds to the overlapping area among the captured areas.

18. The method of claim 10, wherein the visually displaying of the area-specific congestion comprises displaying a heat map on the two-dimensional map according to the area-specific congestion for each of the captured areas.

* * * * *